(12) United States Patent
Tu et al.

(10) Patent No.: US 10,783,912 B1
(45) Date of Patent: Sep. 22, 2020

(54) CALIBRATING ELEVATOR ACTUATOR FOR DISK DRIVE

(71) Applicant: Western Digital Technologies, Inc., San Jose, CA (US)

(72) Inventors: Kuang-Yang Tu, Irvine, CA (US); Jenghung Chen, Cupertino, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/718,828

(22) Filed: Dec. 18, 2019

Related U.S. Application Data

(63) Continuation-in-part of application No. 16/433,110, filed on Jun. 6, 2019, now Pat. No. 10,622,012.

(60) Provisional application No. 62/851,169, filed on May 22, 2019.

(51) Int. Cl.
| | |
|---|---|
| *G11B 5/55* | (2006.01) |
| *G11B 5/596* | (2006.01) |
| *G11B 5/60* | (2006.01) |
| *G11B 5/54* | (2006.01) |

(52) U.S. Cl.
CPC ........ *G11B 5/59688* (2013.01); *G11B 5/6029* (2013.01); *G11B 5/54* (2013.01); *G11B 5/556* (2013.01); *G11B 5/5578* (2013.01); *G11B 5/607* (2013.01); *G11B 5/6058* (2013.01)

(58) Field of Classification Search
None
See application file for complete search history.

(56) References Cited

U.S. PATENT DOCUMENTS

| | | | | |
|---|---|---|---|---|
| 5,559,648 | A | 9/1996 | Hunter et al. | |
| 5,982,573 | A * | 11/1999 | Henze | G11B 5/54 360/60 |
| 7,068,451 | B1 * | 6/2006 | Wang | G11B 5/59627 360/25 |
| 7,365,932 | B1 * | 4/2008 | Bennett | G11B 5/5569 360/77.02 |
| 7,619,844 | B1 * | 11/2009 | Bennett | G11B 5/5547 360/75 |
| 7,808,745 | B2 * | 10/2010 | Oh | G11B 21/22 360/256.2 |
| 7,986,491 | B2 | 7/2011 | Albrecht et al. | |
| 8,112,580 | B2 | 2/2012 | Bandic et al. | |

(Continued)

OTHER PUBLICATIONS

International Search Report for corresponding Intl Application No. PCT/US19/68514 dated May 3, 2020.

*Primary Examiner* — Tan X Dinh

(57) ABSTRACT

A data storage device is disclosed comprising an elevator actuator configured to actuate a head along an axial dimension, and a position sensor configured to generate a sinusoidal sensor signal representing a position of the head along the axial dimension, wherein the position sensor comprises a sensor element and an encoder strip comprising a pattern having at least one region that causes a disturbance in the sinusoidal sensor signal. The elevator actuator is controlled to move the head in a first direction along the axial dimension to detect the disturbance in the sinusoidal sensor signal, and when the disturbance in the sinusoidal signal is detected, the elevator actuator is controlled to move the head in a second direction along the axial dimension opposite the first direction in order to measure a zero crossing of the sinusoidal sensor signal.

15 Claims, 14 Drawing Sheets

(56) References Cited

U.S. PATENT DOCUMENTS

| | | |
|---|---|---|
| 8,208,215 B2 | 6/2012 | Molaro et al. |
| 8,760,796 B1 * | 6/2014 | Lou ...................... G11B 5/5526 360/78.04 |
| 8,824,094 B1 | 9/2014 | Furlong et al. |
| 9,007,714 B1 * | 4/2015 | Zheng .................. G11B 5/5552 360/75 |
| 10,622,012 B1 * | 4/2020 | Tu ............................ G11B 5/54 |
| 2008/0144210 A1 * | 6/2008 | Dougherty ......... G11B 5/59644 360/77.02 |
| 2010/0091408 A1 | 4/2010 | Albrecht et al. |

* cited by examiner

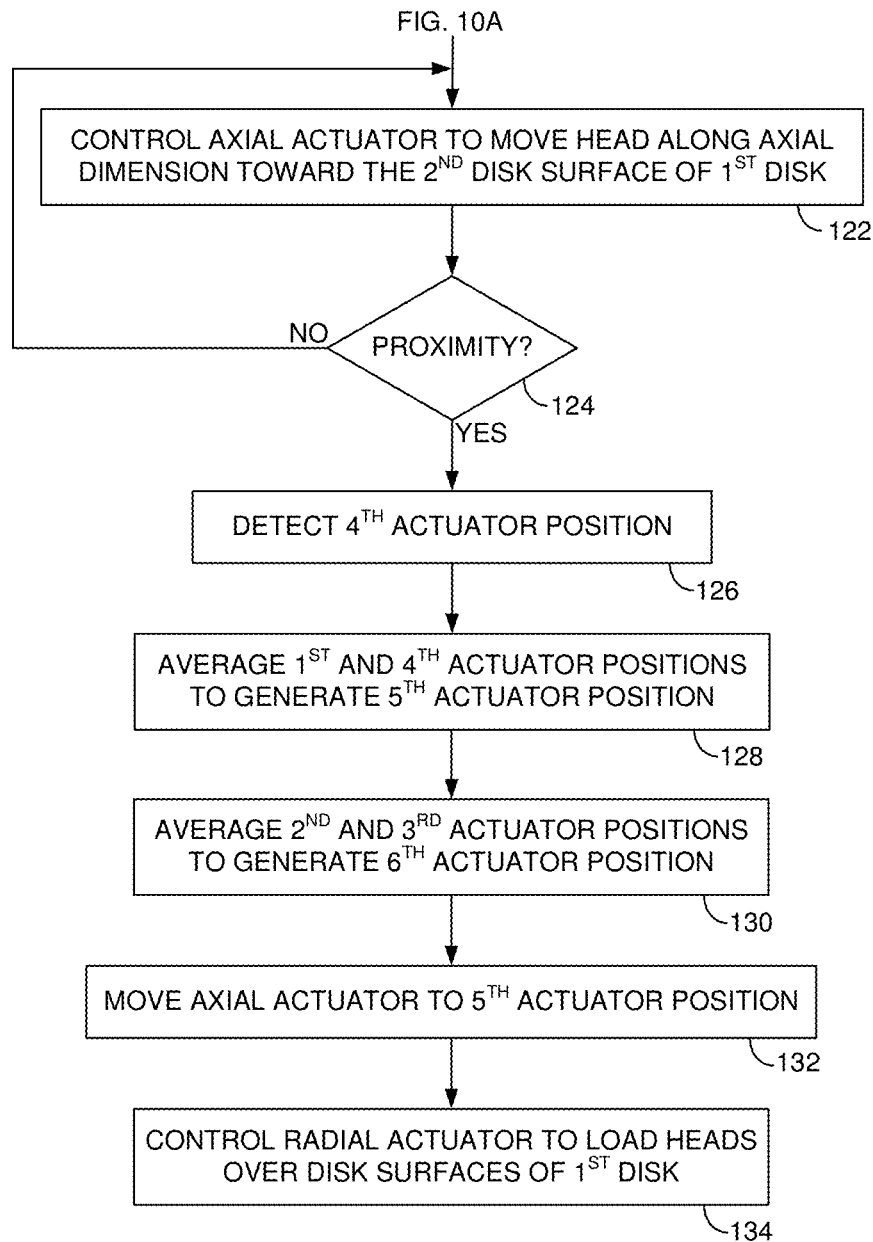

CALIBRATING ELEVATOR ACTUATOR FOR DISK DRIVE

CROSS REFERENCE TO RELATED APPLICATIONS

This application is a continuation-in-part of U.S. patent application Ser. No. 16/433,110, filed on Jun. 6, 2019, which claims priority to U.S. Provisional Patent Application Ser. No. 62/851,169, filed on May 22, 2019, which are hereby incorporated by reference in their entirety.

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

A disk drive typically comprises a plurality of disks each having a top and bottom surface accessed by a respective head. That is, the VCM typically rotates a number of actuator arms about a pivot in order to simultaneously position a number of heads over respective disk surfaces based on servo data recorded on each disk surface. FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

BRIEF DESCRIPTION OF THE DRAWINGS

FIGS. 10A and 10B show a flow diagram according to an embodiment wherein the proximity sensor(s) is used to estimate an initial load position of the actuator arm and ramp relative to each disk.

DETAILED DESCRIPTION

Figure 2A:
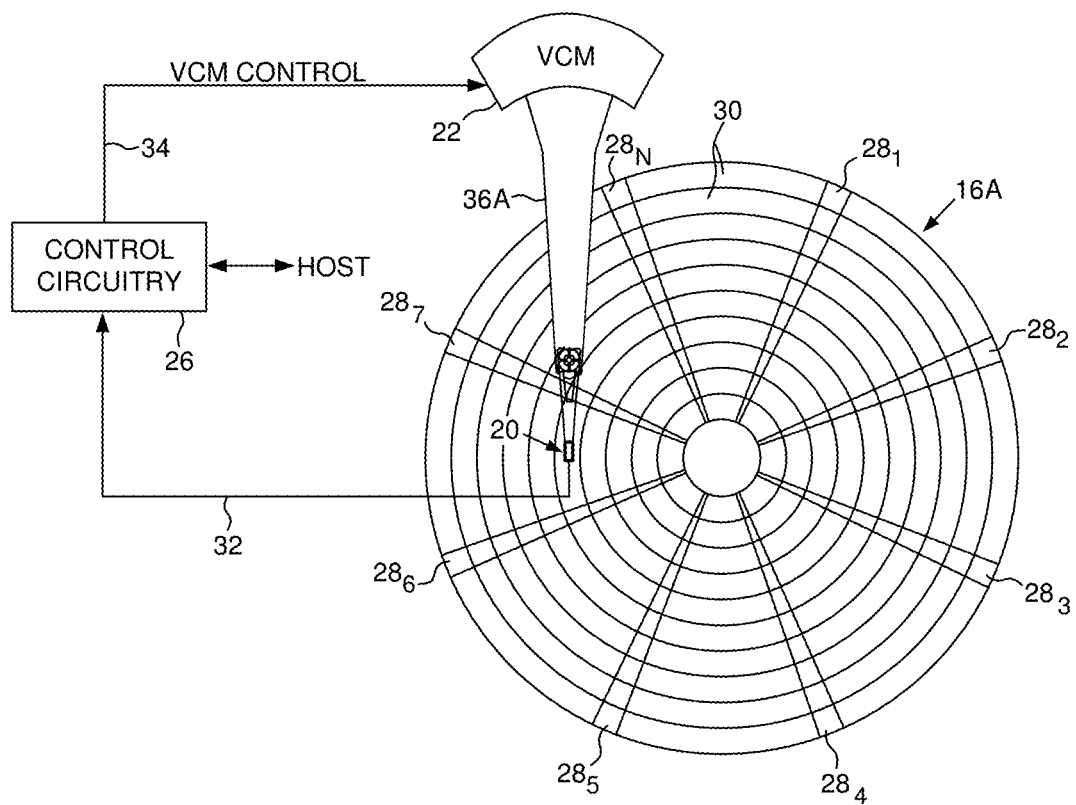
FIGS. 2A-2C show a data storage device in the form of a disk drive according to an embodiment comprising an elevator actuator configured to actuate a head along an axial dimension relative to first and second disks, a radial actuator configured to actuate the head radially over the disk surfaces, and a position sensor configured to generate a sinusoidal sensor signal representing a position of the head along the axial dimension.
Figure 2B:
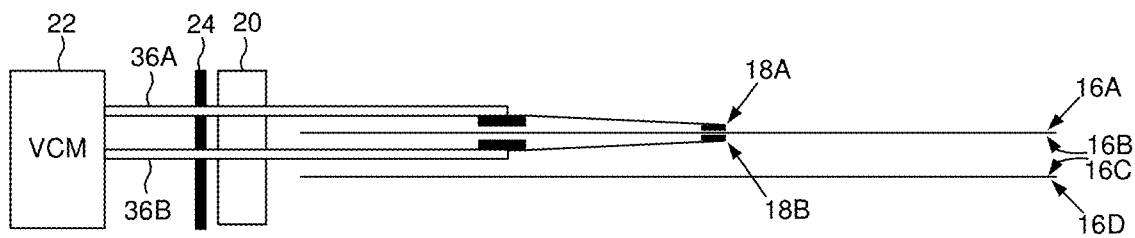
Figure 2C:
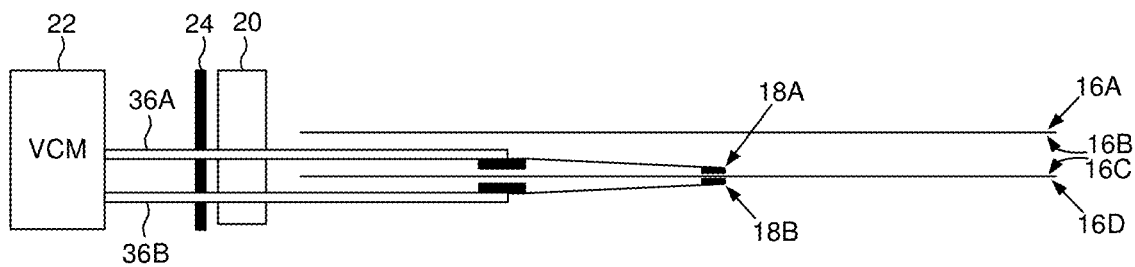

FIGS. 2A-2C show a data storage device in the form of a disk drive according to an embodiment comprising a first disk comprising a first disk surface 16A and a second disk comprising a second disk surface 16C. An elevator actuator 20 is configured to actuate a head 18A along an axial dimension relative to the first and second disks, and a radial actuator 22 configured to actuate the head 18A radially over the first disk surface 16A or the second disk surface 16C. A position sensor 24 is configured to generate a sinusoidal sensor signal representing a position of the head 18A along the axial dimension. The disk drive further comprises control circuitry 26 configured to measure a crashstop offset (represented as crashstop_offset in the description below) along the axial dimension from a crashstop position of the elevator actuator 20 to a zero crossing of the sinusoidal sensor signal.

Figure 1:
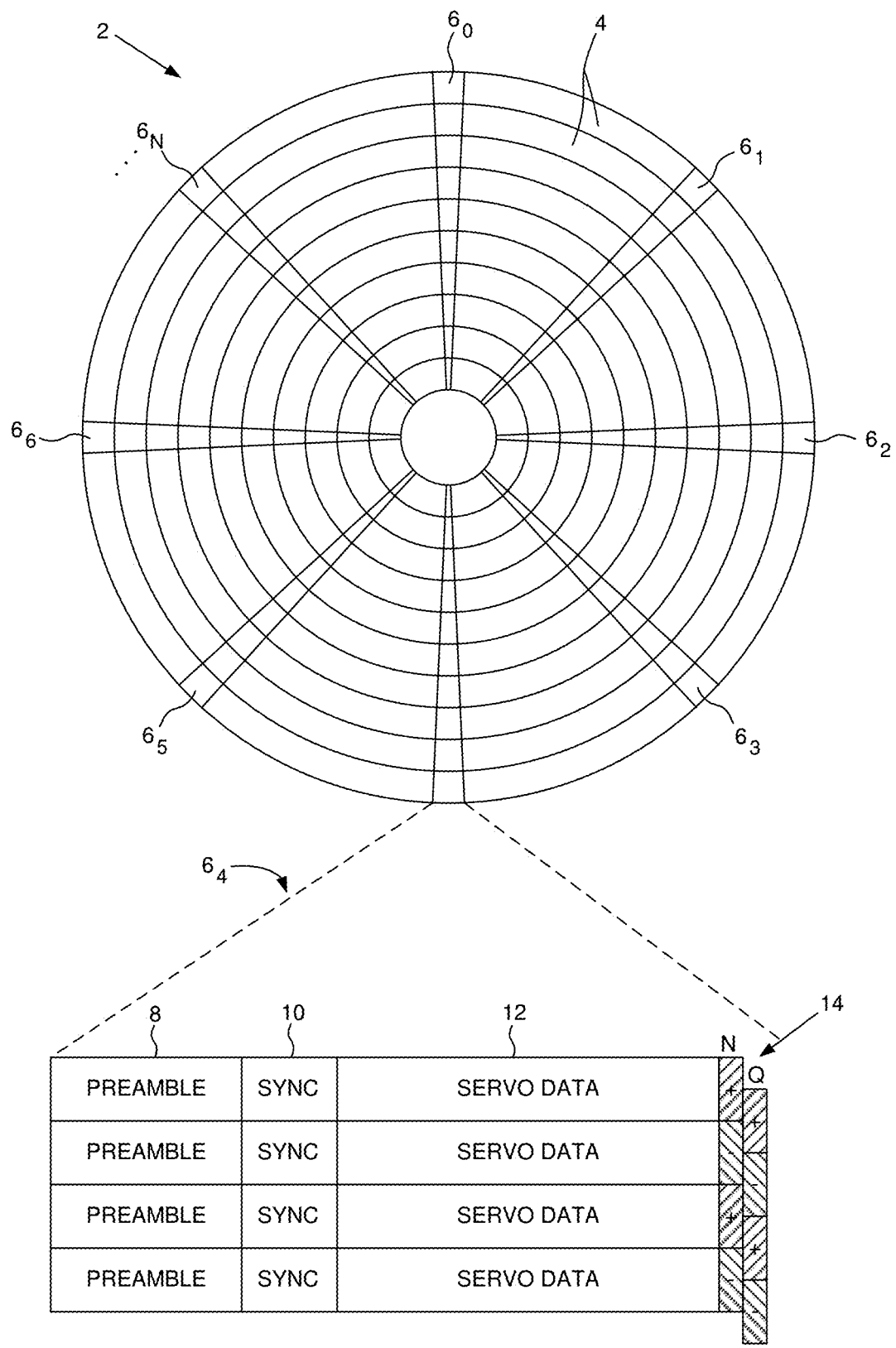
FIG. 1 shows a prior art disk format comprising a plurality of servo tracks defined by servo sectors.

In the embodiment of FIG. 2A, each disk surface comprises a plurality of servo sectors 28₁-28N that define a plurality of servo tracks, wherein data tracks 30 are defined relative to the servo tracks at the same or different radial density. The control circuitry 26 processes a read signal 32 emanating from the head 18A to demodulate the servo sectors and generate a position error signal (PES) representing an error between the actual position of the head and a target position relative to a target track. A servo control system in the control circuitry 26 filters the PES using a suitable compensation filter to generate a control signal 34 applied to a VCM 22 which rotates an actuator arm 36A about a pivot in order to actuate the head radially over the disk surface in a direction that reduces the PES. In one embodiment, the head 18A may be actuated over the disk surface 16A based on the PES using one or more secondary actuators, for example, a microactuator that actuates a suspension coupling a head slider to the actuator arm 36A, or a microactuator that actuates the head slider relative to the suspension (e.g., using a thermal actuator, piezoelectric actuator, etc.). The servo sectors 28₁-28N may comprise any suitable head position information, such as a track address for coarse positioning and servo bursts for fine positioning. The servo bursts may comprise any suitable pattern, such as an amplitude based servo pattern or a phase based servo pattern (FIG. 1).

In the embodiment shown in FIGS. 2B-2C, the VCM 22 actuates two actuator arms 36A and 36B each actuating a respective head 18A and 18B. The elevator actuator 20 in this embodiment actuates the actuator arms 36A and 36B in an axial dimension relative to the disks, effectively implementing an "elevator" system that raises/lowers the actuator arms 36A and 36B to enable the heads 18A and 18B to access the top and bottom surfaces of multiple disks (two disks in this example). This embodiment reduces the cost of the disk drive by reducing the number of actuator arms as well as the number of heads needed to access disk surface as compared to a conventional disk drive employing multiple actuator arms for actuating a respective head over a respective (dedicated) disk surface. This embodiment may also reduce the cost of the VCM 22 since it reduces the number (mass) of actuator arms rotated about the pivot. Another embodiment may employ a single actuator arm for actuating two heads or a single head, thereby further reducing the cost of the disk drive. In yet another embodiment, a different type of radial actuator may be employed to actuate the head(s) radially over the disk surfaces, such as a linear actuator.

Figure 3A:
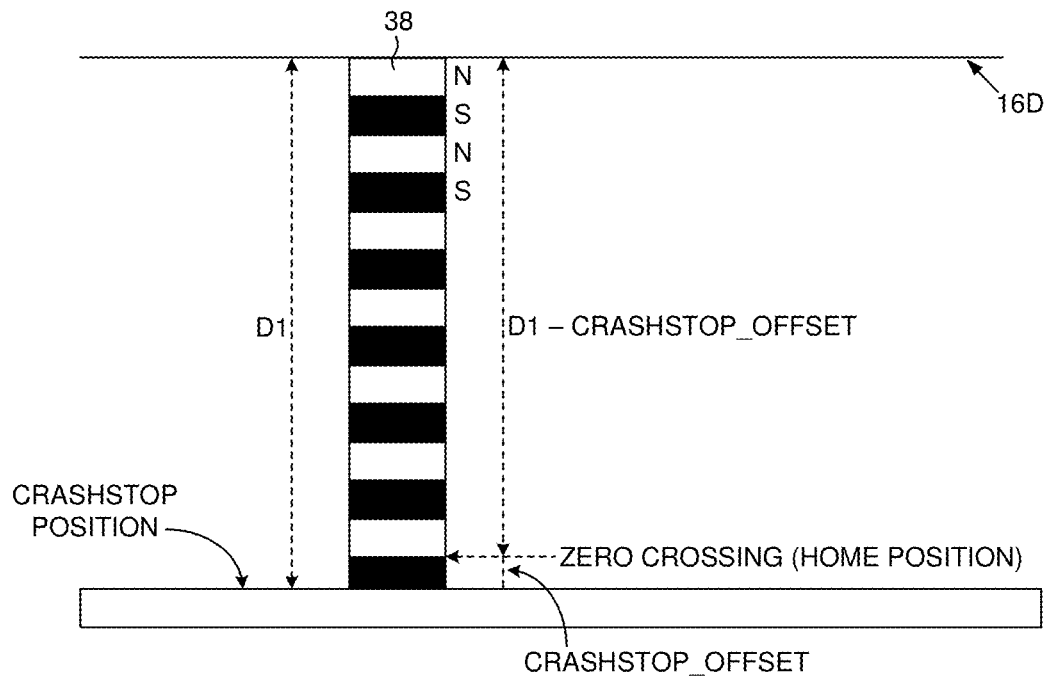
FIG. 3A shows an embodiment wherein a crashstop_offset is measured along the axial dimension from a crashstop position of the elevator actuator to a zero crossing of the sinusoidal sensor signal.
Figure 3B:
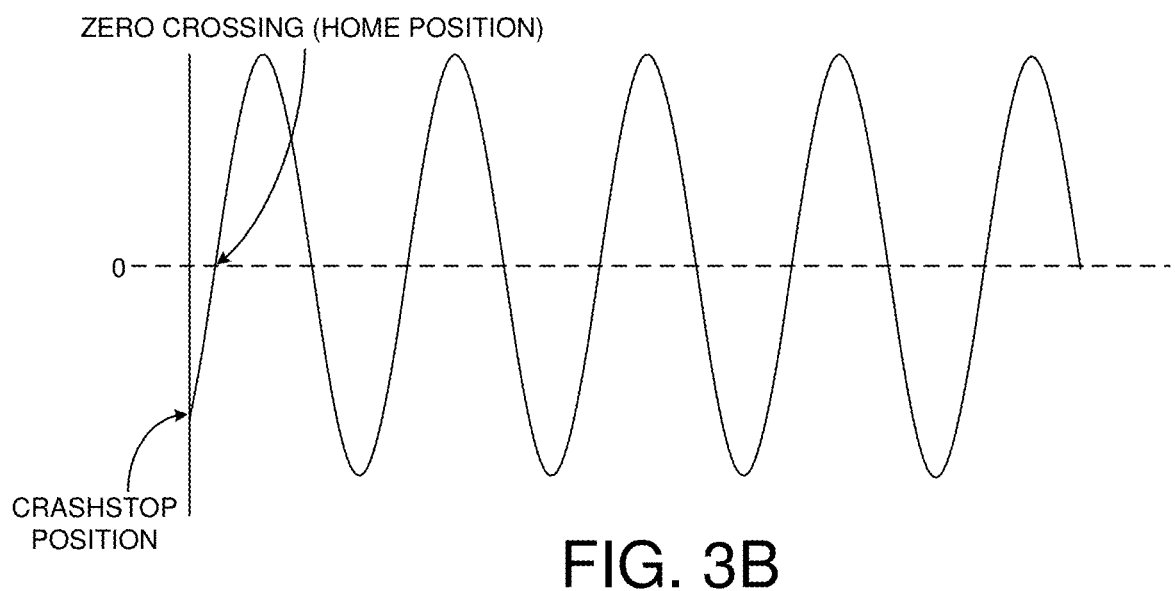
FIG. 3B shows a sinusoidal sensor signal generated by the position sensor according to an embodiment.

Any suitable position sensor 24 may be employed in the embodiments disclosed herein, such as any suitable optical or magnetic sensor. In addition, the position sensor may be implemented in any suitable mechanical configuration, such as an encoder strip and a corresponding transducer coupled to the actuator arm assembly as shown in the embodiment of FIG. 2B. FIG. 3A shows an embodiment wherein the position sensor 24 comprises a magnetic encoder strip 38 comprising a plurality of alternating polarity fixed magnets (N/S, N/S, . . . ). The magnetic encoder strip 38 is fixed relative to the actuator arms and a suitable magnetic sensor, such as a Hall effect sensor, is coupled, for example, to the actuator arms 36A and 36B. As the elevator actuator 20 moves the actuator arms 36A and 36B in the axial dimension in order to reposition the head(s) over different disk surfaces, the magnetic sensor generates a sinusoidal sensor signal such as shown in FIG. 3B due to sensing the alternating magnetic field of the magnetic encoder strip 38.

In one embodiment, the encoder strip 38 such as shown in FIG. 3A as well as the disks may be installed during manufacturing such that the axial location of each disk surface relative to the encoder strip 38 may be known within an insignificantly small variance. However in one embodiment, the variance in coupling the actuator arms to the base of the disk drive may create a significant variance between the location of the actuator arms relative to the encoder strip 38 when the elevator actuator 20 reaches a crashstop position. In the example of FIG. 3A, the crashstop position may be defined as the elevator actuator 20 moving the actuator arms down the axial dimension to the lowest point. In one embodiment, the elevator actuator 20 may contact a physical crashstop at this point, and in another embodiment, at least part of the actuator arm assembly may contact a physical crashstop. In one embodiment, the variance between the location of the actuator arms relative to the encoder strip 38 at the crashstop position is calibrated out by detecting a zero crossing in the sinusoidal sensor signal which then defines a home position for the actuator arms relative to the encoder strip 38.

An example of this embodiment is shown in FIG. 3A wherein a crashstop_offset is measured along the axial dimension from a crashstop position of the elevator actuator 20 to a zero crossing of the sinusoidal sensor signal. In the example of FIGS. 3A and 3B, the elevator actuator 20 moves the actuator arms up the axial dimension until the first zero crossing in the sinusoidal sensor signal is detected. In other embodiments, the crashstop_offset may be measured relative to a different (e.g., second) zero crossing in the sinusoidal sensor signal. In one embodiment, the crashstop_offset may be measured by detecting a target zero crossing in the sinusoidal sensor signal, and then moving the elevator actuator 20 to the crashstop position. In one embodiment, the crashstop_offset may be measured by moving the elevator actuator 20 between the crashstop position and the target zero crossing multiple times and averaging the offset measurements. In yet another embodiment, the crashstop_offset may be measured by detecting multiple zero crossings in the sinusoidal sensor signal. For example, in the example of FIG. 3A the elevator actuator 20 may move the actuator arms up the axial dimension over multiple zero crossings and the crashstop_offset (e.g., relative to the first zero crossing) may be measured based on the measured position of the multiple zero crossings (e.g., by averaging out noise in the sinusoidal sensor signal).

Figure 4:
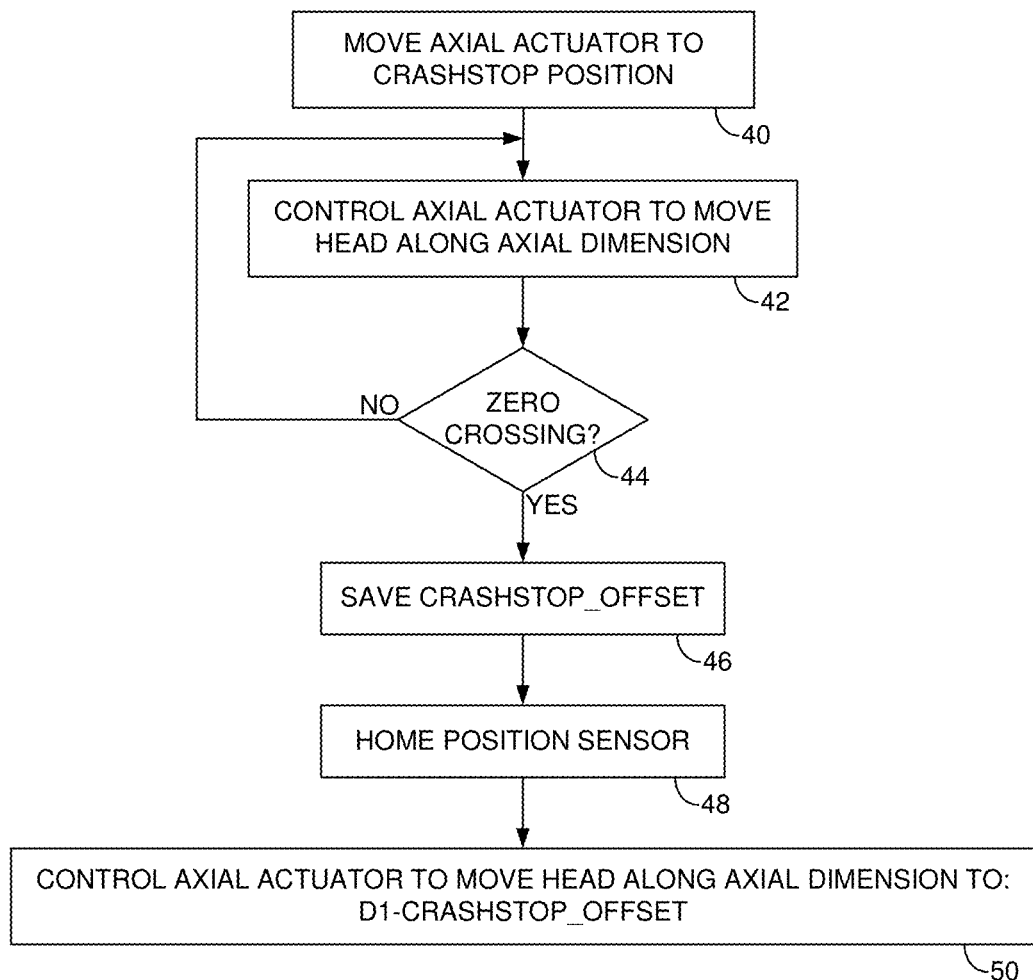
FIG. 4 is a flow diagram according to an embodiment wherein the crashstop_offset is used to position the head relative to the first disk surface.

In one embodiment, after measuring the crashstop_offset relative to a target zero crossing, the elevator actuator 20 is controlled to move the head(s) to a nominal position representing the location of a target disk surface (e.g., move head 18B to disk surface 16D in FIG. 2C). In one embodiment, the nominal position is defined as a nominal distance D1 from the crashstop position to the position representing the target disk surface. Accordingly in one embodiment, the elevator actuator 20 is first moved to the target zero crossing described above which represents the home position for the position sensor 24, and then the elevator actuator 20 is moved a distance:

D1-crashstop_offset in order position the head(s) to the nominal position representing the location of the target disk surface. An example of this embodiment is understood with reference to the flow diagram of FIG. 4, wherein the elevator actuator 20 is moved to the crashstop position (block 40), and then the elevator actuator 20 moves the heads along the axial dimension (block 42) until the first zero crossing is detected in the sinusoidal sensor signal (block 44). The corresponding crashstop_offset is saved (block 46), and the position sensor is "homed" based on the detected zero crossing (block 48). For example, the "home" position may be defined as a distance of zero along the axial dimension which may be defined by the location of the detected zero crossing in the sinusoidal sensor signal. The elevator actuator 20 then moves the head(s) from the home position to the nominal position of a target disk surface by moving the head(s) by a distance of D1 minus the crashstop_offset (block 50).

In one embodiment, the measured crashstop_offset may be saved, for example, in a non-volatile semiconductor memory and then used to move the head(s) to a first target disk surface when the disk drive is powered on. For example, when the disk drive is powered on the elevator actuator 20 may be moved to the crashstop position and then moved up until detecting the first zero crossing in the sinusoidal sensor signal which defines the home position for the elevator actuator. The elevator actuator 20 then moves the heads by the distance D1 minus the saved crashstop_offset (i.e., in this embodiment it is unnecessary to remeasure the crashstop_offset).

In one embodiment, the elevator actuator 20 may be controlled open loop when moving to the crashstop position as well as moving to the target zero crossing of the sinusoidal sensor signal as described above with reference to FIGS. 3A and 3B. After homing the position sensor 24 based on the detected zero crossing, in one embodiment the elevator actuator 20 may be controlled closed loop based on any suitable states (velocity, position, etc.) as determined from the position sensor 24. For example, in one embodiment the elevator actuator 20 may be controlled using a suitable velocity profile in order to seek the head(s) along the axial dimension toward a target position relative to the disk surfaces. When the head(s) are within a predetermined threshold of the target position, the closed loop control may switch the feedback in order to control the elevator actuator 20 based on a position error in order to settle onto the target position.

Figure 5A:
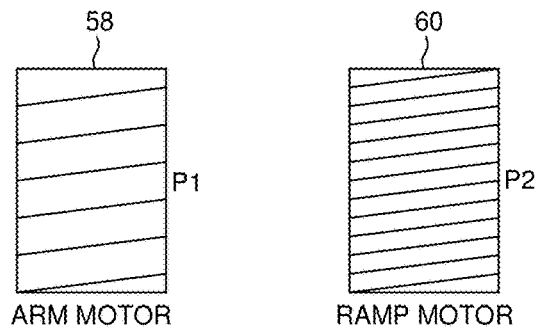
FIG. 5A shows an embodiment wherein a first elevator actuator comprising a first lead screw having a first pitch actuates an actuator arm along the axial dimension, and a second elevator actuator comprising a second lead screw having a second pitch actuates at least part of a load/unload ramp along the axial dimension.

In one embodiment (an example of which is shown in FIGS. 6A-6D), the disk drive may comprise a ramp 52 configured to load/unload the head(s) to and from a target disk surface. In one embodiment, the actuator arm(s) may be actuated along the axial direction by a first elevator actuator 54, and at least part of the ramp 52 may be simultaneously actuated along the axial dimension by a second elevator actuator 56 in order to position the head(s) relative to the disk surfaces prior to loading the head(s) onto a target disk surface. In the embodiment shown in FIGS. 6A-6D, the first elevator actuator 54 comprises a first stepper motor configured to rotate a first lead screw 58 in order to actuate the actuator arms 36A and 36B which are threaded onto the first lead screw 58, and the second elevator actuator 56 comprises a second stepper motor configured to rotate a second lead screw 60 in order to actuate at least part of the ramp 52 which is threaded onto the second lead screw 60. In one embodiment shown in FIG. 5A, the first lead screw 58 comprises a first pitch and the second lead screw 60 comprises a second pitch different than the first pitch. In the example of FIG. 5A, the pitch of the first lead screw 58 is greater than the pitch of the second lead screw 60, but in other embodiments the opposite may be the case.

In one embodiment, the control circuitry 26 synchronizes a simultaneous movement of the first and second elevator actuators 54 and 56, for example, to compensate for the difference in pitch between lead screws such as shown in FIG. 5A. For example, in one embodiment a first velocity command may be generated to move the first elevator actuator 54 and a corresponding second velocity command may be generated to simultaneously move the second elevator actuator 56. In one embodiment, the second velocity command may initially be generated based on a default (nominal) pitch ratio between the first and second lead screws 58 and 60:

$$VELcmd1=VEL1$$

$$VELcmd2=VELcmd1*P1def/P2def$$

where P1def represents the default pitch of the first lead screw 58 and P2def represents the default pitch of the second lead screw 60. After homing the first and second elevator actuators 54 and 56 as described above, the actual pitch of each lead screw 58 and 60 is measured, and the measured pitches are used to generate the velocity commands for simultaneously and synchronously moving the first and second elevator actuators 54 and 56:

$$VELcmd1=VEL1$$

$$VELcmd2=VELcmd1*P1mes/P2mes$$

where P1mes represents the measured pitch of the first lead screw 58 and P2mes represents the measured pitch of the second lead screw 60.

Figure 5B:
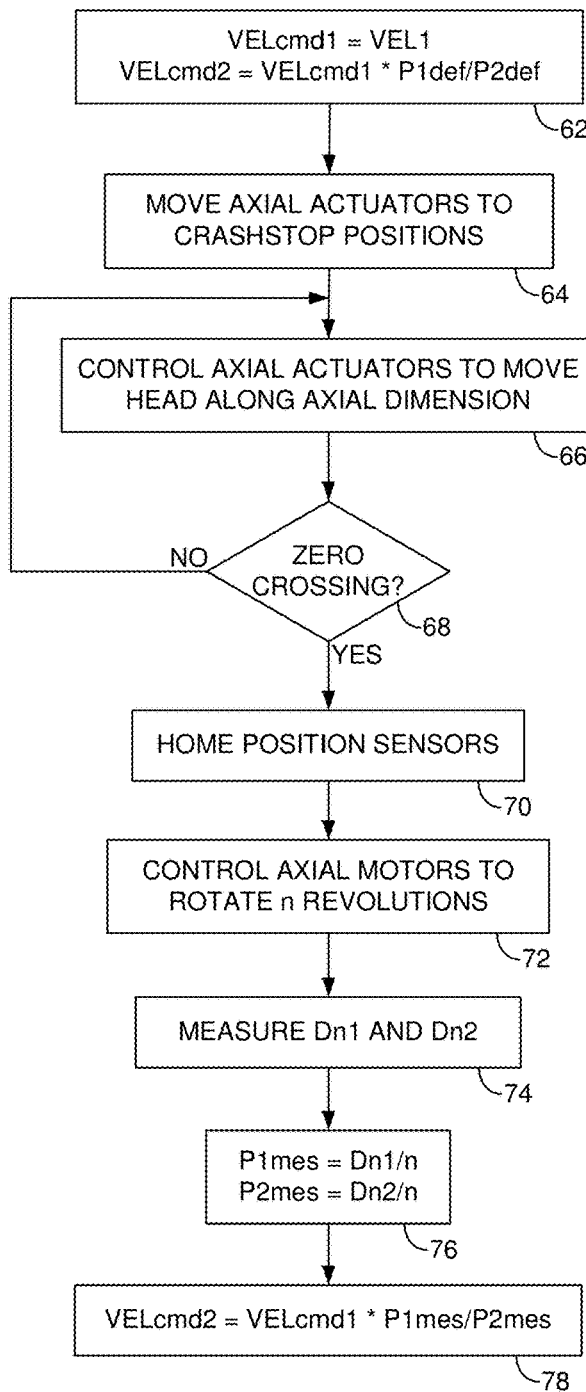
FIG. 5B is a flow diagram according to an embodiment wherein the first pitch of the first elevator actuator and the second pitch of the second elevator actuator are measured in order to synchronize the simultaneous movement of both actuators.

An example of this embodiment is understood with reference to the flow diagram of FIG. 5B, wherein default velocity commands are generated for the first and second elevator actuators (block 62) based on the ratio of the default pitches of the lead screws 58 and 60 as described above. Each elevator actuator is moved to their respective crashstop positions using their respective default velocity commands (block 64). Each elevator actuator is then moved up toward a first zero crossing of at least one of the sinusoidal position signals (block 66) until the first zero crossing is detected (block 68). The position sensors are homed (e.g., zeroed) based on the detected zero crossing (block 70). Both axial motors are controlled to rotate n full revolutions (block 72), and the corresponding displacements Dn1 and Dn2 of the actuator arm(s) and ramp are measured based on the corresponding position sensors (block 74). The pitches of each lead screw is then measured (block 76). based on:

$$P1mes=Dn1/n$$

$$P2mes=Dn2/n$$

where P1mes represents the measured pitch of the first lead screw and P2mes represents the measured pitch of the second lead screw. The velocity command for the second elevator actuator is then generated based on the ratio of the measured pitches (block 78). In an alternative embodiment, a velocity command may be generated for the second elevator actuator and a corresponding velocity command generated for the first elevator actuator based on the ratio of the measured pitches.

Figure 6A:
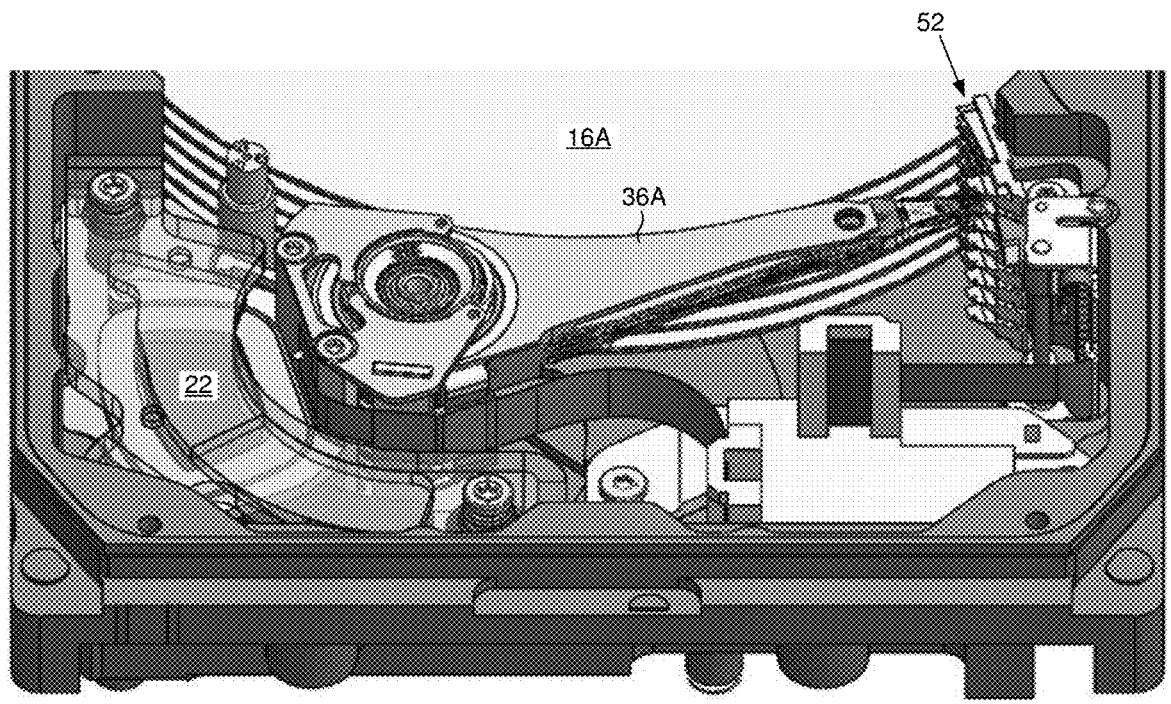
FIGS. 6A-6D show a disk drive according to an embodiment comprising a first elevator actuator configured to actuate two actuator arms along an axial dimension relative to multiple disks, and a second elevator actuator configured to actuate at least part of a ramp along the axial dimension.
Figure 6B:
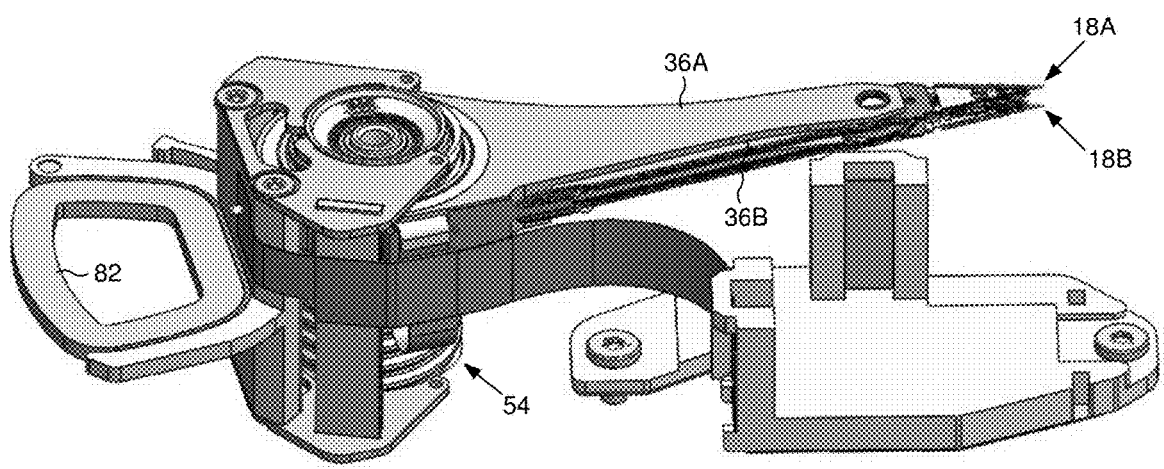
Figure 6C:
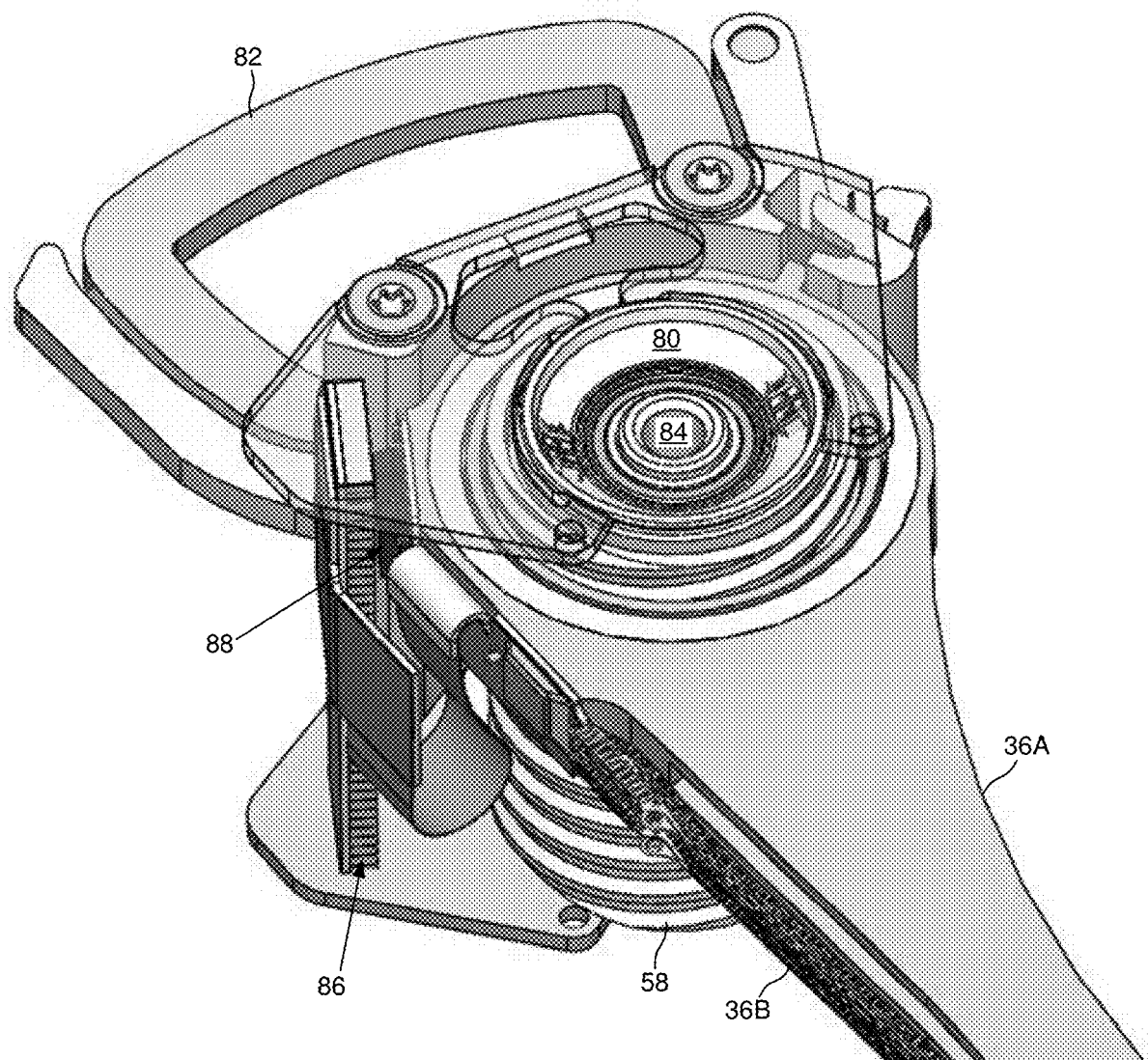
Figure 6D:
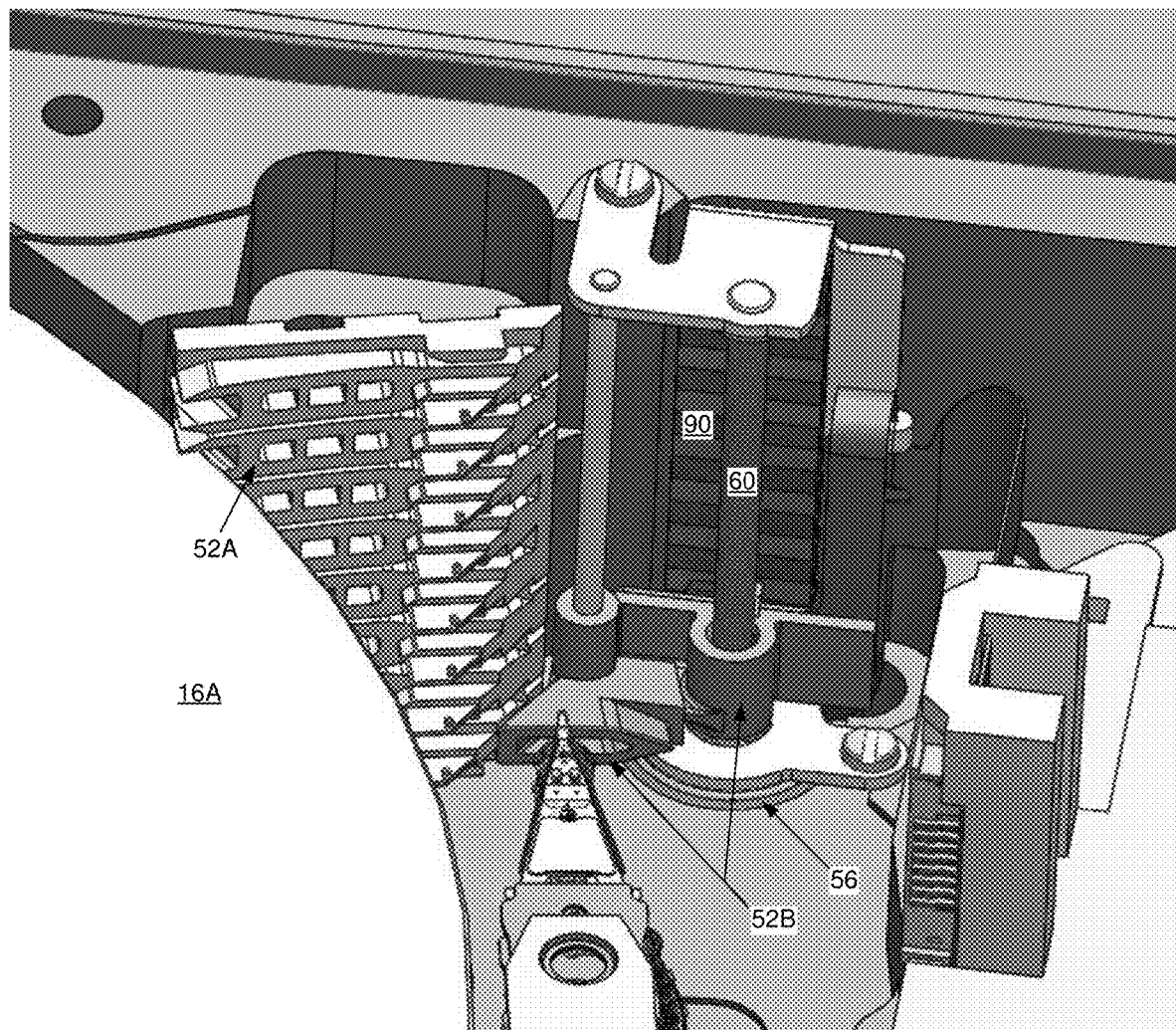

FIGS. 6A-6D show a disk drive according to an embodiment comprising a first elevator actuator 54 (FIG. 6B) configured to actuate two actuator arms 36A and 36B along an axial dimension relative to multiple disks, and a second elevator actuator 56 (FIG. 6D) configured to actuate at least part of a ramp along the axial dimension. The first elevator actuator 54 comprises a first stepper motor configured to rotate a first lead screw 58 (FIG. 6C) in order to vertically actuate the actuator arms 36A and 36B which are threaded onto the first lead screw 58, and the second elevator actuator 56 comprises a second stepper motor configured to rotate a second lead screw 60 (FIG. 6D) in order to vertically actuate at least part of the ramp 52B which is threaded onto the second lead screw 60. In the embodiment of FIG. 6D, the ramp 52 comprises a first ramp part 52A that is fixed relative to the disks, and a second ramp part 52B that is vertically actuated in the axial dimension by rotating the second lead screw 60. The heads 18A and 18B are unloaded onto the second ramp part 52B prior to vertically actuating the second ramp part 52B in the axial dimension. After positioning the second ramp part 52B to a target disk, the heads 18A and 18B are loaded onto the respective disk surfaces by rotating the actuator arms 36A and 36B such that the heads slide along the second ramp part 52B onto the first ramp part 52A, and then loaded from the first ramp part 52A onto the respective disk surfaces.

In the embodiment of FIG. 6C, the first lead screw 58 comprises a cylindrical assembly that is rotated (clockwise or counter-clockwise) about a pivot assembly 80 using any suitable stepper motor (e.g., a claw-pole permanent magnet stepper motor), thereby adjusting the vertical position of the actuator arms 36A and 36B along the axial dimension. A voice coil 82 is coupled to the pivot assembly 80 which is rotated about a fixed pivot 84 in order to rotate the combined assembly (voice coil 82, actuator arms 36A and 36B, and lead screw 58) about the fixed pivot 84, thereby actuating the heads 18A and 18B radially over the respective disk surfaces. The combined assembly further comprises an encoder strip 86 (similar to the encoder strip 38 of FIG. 3A) coupled to the voice coil assembly and at least one sensor 88 coupled to the actuator arm assembly. As the actuator arms 36A and 36B move along the axial dimension, the sensor 88 generates a sinusoidal sensor signal such as shown in FIG. 3B which may be demodulated in any suitable manner to generate a position signal representing a position of the actuator arms along the axial dimension. In the embodiment of FIG. 6D, the ramp assembly also comprises an encoder strip 90 (similar to the encoder strip 38 of FIG. 3A) and at least one sensor coupled to the second ramp part 52B for generating a sinusoidal sensor signal such as shown in FIG. 3B as the second ramp part 52B moves along the axial dimension by rotating the second lead screw 62 using any suitable stepper motor.

Figure 7A:
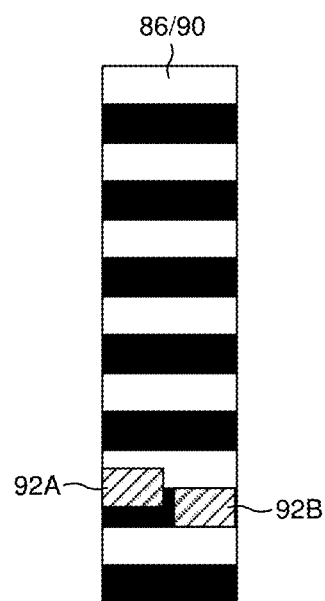
FIGS. 7A and 7B show an embodiment wherein the position sensor comprises two sensor elements configured to generate quadrature sinusoids in order to compensate for amplitude variations in the sensor signals.
Figure 7B:
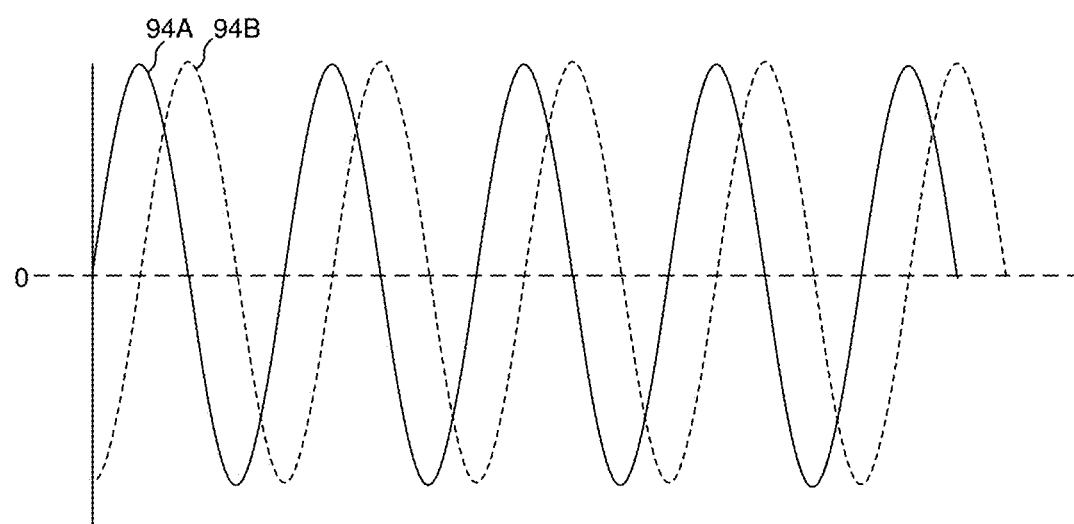

FIGS. 7A and 7B show an embodiment wherein the position sensor comprises two sensor elements 92A and 92B (e.g., two Hall effect sensors) configured to generate respective quadrature sinusoids 94A and 94B (phase offset by ninety degrees) in order to compensate for amplitude variations in the sensor signals 92A and 92B. In one embodiment, the first quadrature sinusoid 94A generated by the first sensor element 92A may be represented as:

$$g \cdot \sin(t)$$

and the second quadrature sinusoid 94B generated by the second sensor element 92B may be represented as:

$$g \cdot \cos(t)$$

where g represents a gain of the sinusoids. In one embodiment, the gain g (and corresponding amplitude of the sinusoids) may vary due, for example, to temperature fluctuations or fluctuations in the gap between the encoder strip 86/90 and the sensor elements 92A and 92B across the stroke of the sensor elements. Variations in the amplitude of a single sinusoidal signal generated by a single sensor element may induce errors in the position signal demodulated from the sinusoidal signal. This amplitude variation can be compensated by employing two sensor elements 92A and 92B that are offset vertically by ninety degrees (such as shown in FIG. 7A) and by exploiting the trigonometry identity:

$$\mathrm{sqrt}[(g \cdot \sin(t))^2 + (g \cdot \cos(t))^2] = g$$

That is, the amplitude of the quadrature sinusoids 94A and 94B may be normalized by dividing the output of each sensor element 92A and 92B by the above trigonometry identity:

$$\frac{g \cdot \sin(t)}{\mathrm{sqrt}[(g \cdot \sin(t))^2 + (g \cdot \cos(t))^2]} = \sin(t)$$

$$\frac{g \cdot \cos(t)}{\mathrm{sqrt}[(g \cdot \sin(t))^2 + (g \cdot \cos(t))^2]} = \cos(t)$$

In other embodiments, other anomalies in the quadrature sinusoids 94A and 94B may be compensated using any suitable signal processing techniques prior to normalizing the amplitude as described above, such as compensating for a sensitivity difference between the sensor elements 92A and 92B resulting in different relative amplitudes of the quadrature sinusoids, compensating for a phase error between the quadrature sinusoids, or compensating for a DC offset of the quadrature sinusoids.

Figure 8A:
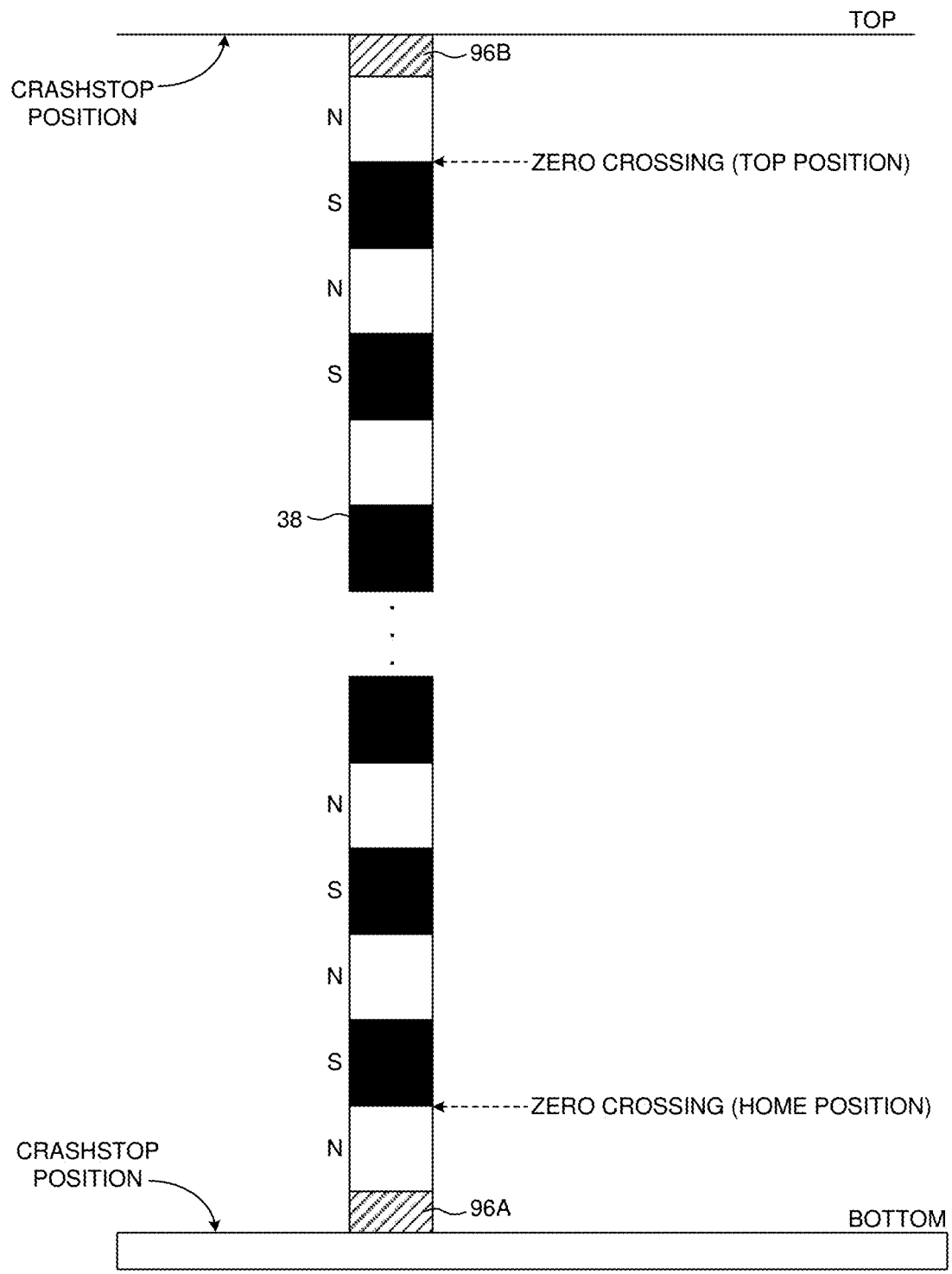
FIGS. 8A and 8B shows an embodiment wherein the position sensor comprises a magnetic encoder strip having a pattern of alternating polarity fixed magnets and at least one region in the pattern that causes a disturbance in the sinusoidal sensor signal.

FIG. 8A shows an embodiment wherein the magnetic encoder strip 38 comprises a pattern of alternating polarity fixed magnets and at least one region 96A in the pattern that causes a disturbance in the sinusoidal sensor signal. In an embodiment shown in FIG. 8B, the control circuitry 26 is configured to control the elevator actuator to move the head in a first direction along the axial dimension to detect the disturbance in the sinusoidal sensor signal, and when the disturbance in the sinusoidal signal is detected, control the elevator actuator to move the head in a second direction along the axial dimension opposite the first direction and measure a zero crossing of the sinusoidal sensor signal.

Figure 8B:
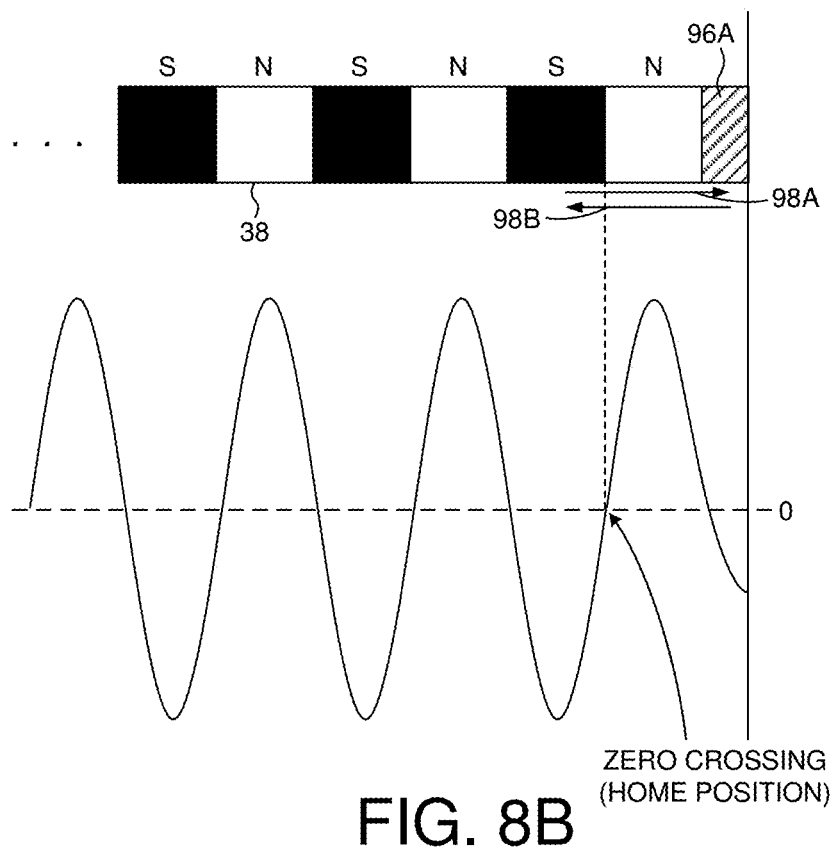

In the embodiment of FIG. 8B, the control circuitry 26 controls the elevator actuator to move the head in a first direction 98A toward the bottom crashstop position; however, the disturbance in the sinusoidal signal (due to the region 96A in the pattern of the magnetic encoder strip 38) is detected prior to the elevator actuator contacting the bottom crashstop which may avoid damaging the elevator actuator or other components. Once the disturbance is detected, the control circuitry 26 reverses the direction of the elevator actuator and moves the head in a second direction 98B in order to detect the zero-crossing that represents the home position of the position sensor as shown in FIG. 8B. A similar procedure may be performed at the top of the position sensor 38 shown in FIG. 8A, wherein the head is moved toward the top crashstop until region 96B is detected, and then the head is moved down until detecting the zero crossing that represents the top of the position sensor.

Figure 8C:
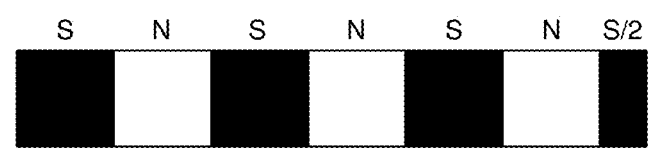
FIG. 8C shows an embodiment wherein the region in the pattern consists of a segment of one of the fixed magnets that is twenty-five to seventy-five percent of a full length of one of the fixed magnets.
Figure 8D:
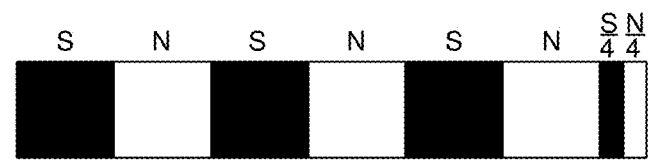
FIG. 8D shows an embodiment wherein the region in the pattern consists of a first segment of one of the fixed magnets having a first polarity, and a second segment of one of the fixed magnets having a second polarity opposite the first polarity.

The region 96A or 96B in the pattern of the magnetic encoder strip 38 such as shown in FIG. 8A may comprise any suitable deviation capable of causing a detectable disturbance in the sinusoidal signal. In an embodiment shown in FIG. 8C, the region 96A or 96B may consist of a segment of one of the fixed magnets that is twenty-five to seventy-five percent of a full length of one of the fixed magnets (e.g., half of one of the full magnets as shown in FIG. 8C). In another embodiment shown in FIG. 8D, the region 96A or 96B may consist of a first segment of one of the fixed magnets having a first polarity, and a second segment of one of the fixed magnets having a second polarity opposite the first polarity. In one embodiment, the first segment is ten to thirty percent of one of the fixed magnets (e.g., twenty-five percent) and the second segment is ten to thirty percent of one of the fixed magnets (e.g., twenty-five percent). When the sensor element of the position sensor transitions into region 96A or 96B, the deviation in the pattern of the magnetic encoder strip 38 causes a corresponding deviation in the sinusoidal signal such as shown in FIG. 8B. The deviation in the sinusoidal signal may be detected in any suitable manner, such as by detecting a decrease in the amplitude of the sinusoidal signal. The decrease in amplitude of the sinusoidal signal may be detected in any suitable manner, such as by sampling the sinusoidal signal and computing a discrete Fourier transform at the frequency of the sinusoid.

In the embodiment of FIG. 8A, the position sensor 24 comprises an encoder strip 38 comprising a pattern of alternating polarity fixed magnets and a suitable magnetic sensor element for sensing the pattern. In other embodiment, the position sensor 24 may comprise a suitable optical encoder strip comprising an optical pattern (e.g., a plurality of segments having an alternating degree of reflectivity) and a suitable optical sensor element for sensing the pattern to generate the sinusoidal sensor signal. In this embodiment, the optical pattern may have at least one region that causes a disturbance in the sinusoidal sensor signal similar to the embodiments described above. For example, in one embodiment the region of the optical pattern may comprise a reduction in reflectivity that causes a corresponding decrease in amplitude of the sinusoidal sensor signal. In another embodiment, the region in the optical pattern may comprise a phase or frequency deviation in the reflectivity of the segments that causes a change in phase or frequency of the sinusoidal sensor signal.

Figure 9A:
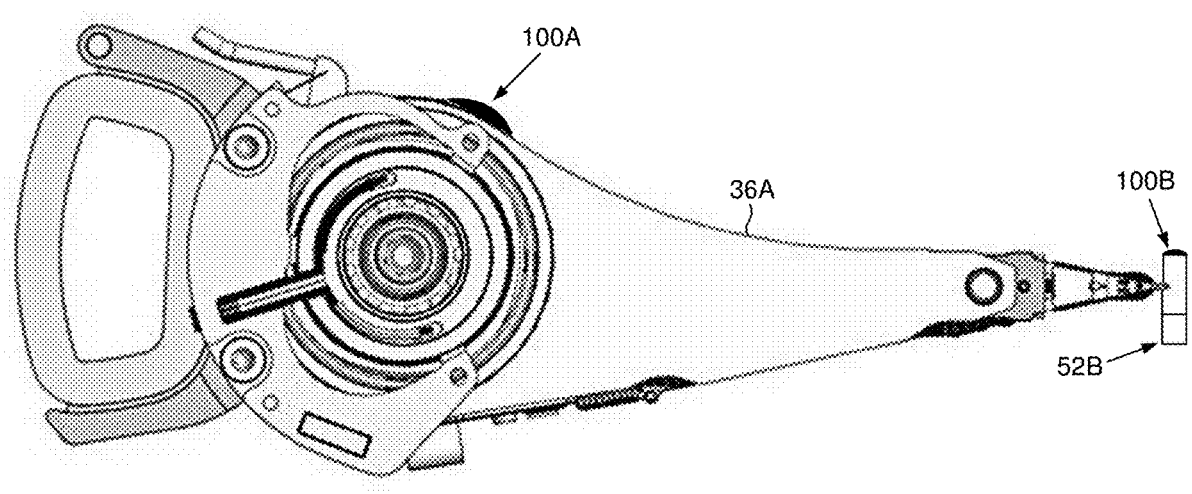
FIG. 9A shows an embodiment wherein an actuator arm comprises a first proximity sensor configured to sense a disk surface, and the ramp comprises a second proximity sensor configured to sense the disk surface.

In one embodiment, at least one actuator arm comprises a suitable proximity sensor configured to detect a proximity of the actuator arm to a disk surface in order to further calibrate the position sensor. FIG. 9A shows an example of this embodiment wherein actuator arm 36A comprises a first proximity sensor 100A coupled to the actuator arm 36A toward the base end and a second proximity sensor 100B coupled to the moving part of the ramp 52 (e.g., moving part 52B in FIG. 6D). Any suitable proximity sensor may be employed, such as a suitable optoelectronic sensor (e.g., the COBP photo reflector NJL5902R-2 manufactured by New Japan Radio Co., Ltd.).

Figure 9B:
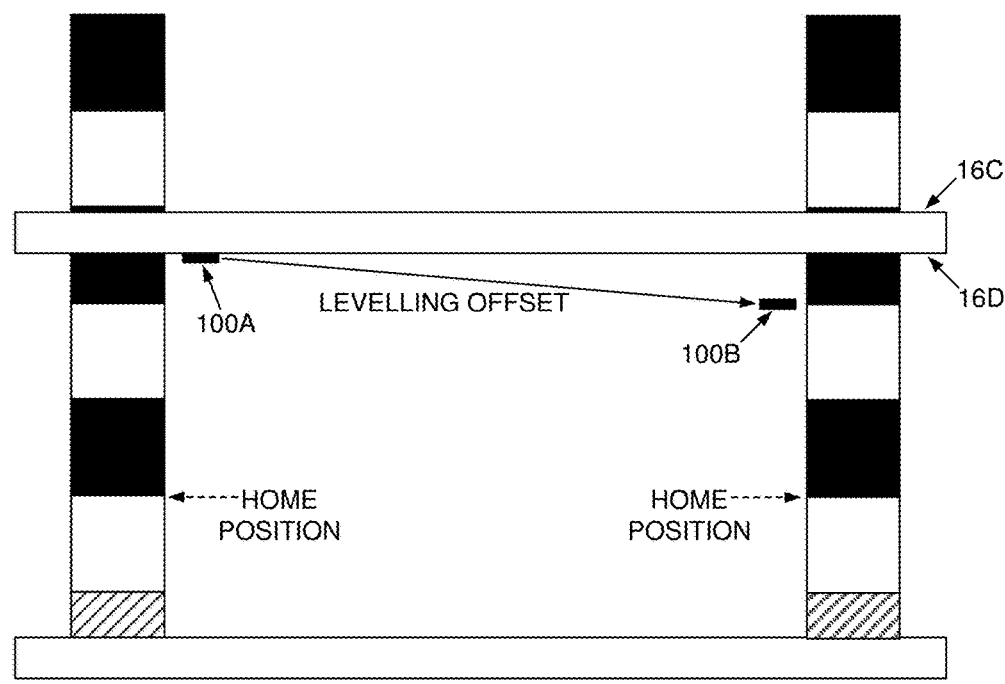
FIG. 9B shows an embodiment wherein the proximity sensors are used to measure a levelling offset between the actuator arm and ramp.

In one embodiment shown in FIG. 9B, there is an axial offset between the actuator arm(s) and the ramp. When calibrating the position sensor for the actuator arm (e.g., FIG. 6C) and the position sensor for the ramp (e.g., FIG. 6D), such as when calibrating the home position of the elevator actuators, in one embodiment the axial offset between the actuator arm and ramp may be measured using the proximity sensors 100A and 100B. In one embodiment, the axial offset is measured by moving the first elevator actuator 54 (FIG. 6B) and the second elevator actuator 56 (FIG. 6D) to their initial home positions (the first zero crossing in the respective sinusoidal signals as described above). Both elevator actuators 54 and 56 are then controlled to move the actuator arm and ramp up toward the disk surface 16D until the disk surface 16D is detected by each of the respective proximity sensors 100A and 100B. When the disk surface 16D is detected by each proximity sensor 100A and 100B, the corresponding position measurement from the respective position sensors is saved. The axial offset (levelling offset) between the elevator actuators is then measured as the difference between the two position sensor measurements. In one embodiment, the initial home position of one of the elevator actuators 54 or 56 is a adjusted to account for the axial offset as measured by the proximity sensors 100A and 100B. In this manner when the elevator actuators are controlled to move the actuator arm(s) and ramp to a load position relative to the disk surfaces, the axial offset between the actuator arm(s) and the ramp is accounted for (i.e., the actuator arm(s) and ramp are considered levelled).

In one embodiment, the proximity sensor(s) 100A and/or 100B may be used to determine a load position for the heads for each disk surface (i.e., a target position for the actuator arm(s) and ramp relative to each disk when a load operation is initiated). However, there may be an offset between when the proximity sensor detects a disk surface (e.g., disk surface 16D) and the actual location of the proximity sensor relative to the disk surface. That is, the proximity sensor may trigger early before the proximity sensor is actually level with the disk surface. Accordingly in one embodiment, the elevator actuators 54 and 56 may be controlled to move the actuator arm(s) and ramp from the home position up toward the disk surface 16D such as shown in FIG. 9B. When the proximity sensor 100A or 100B triggers, the corresponding position sensor measurement is saved. The elevator actuators 54 and 56 are controlled to continue moving the actuator arm(s) and ramp past the disk surface 16C, and then reversed to move the actuator arm(s) and ramp toward the disk surface 16C. When the proximity sensor 100A or 100B triggers, the corresponding position sensor measurement is saved. An initial load position for the actuator arm(s) and ramp may then be estimated as the average of the saved position measurements (i.e., the average of the position measurements for disk surface 16C and disk surface 16D). A similar procedure may be executed to estimate an initial load position for the remaining disks of the disk drive (e.g., each of the two disks shown in FIG. 2B).

Figure 10A:
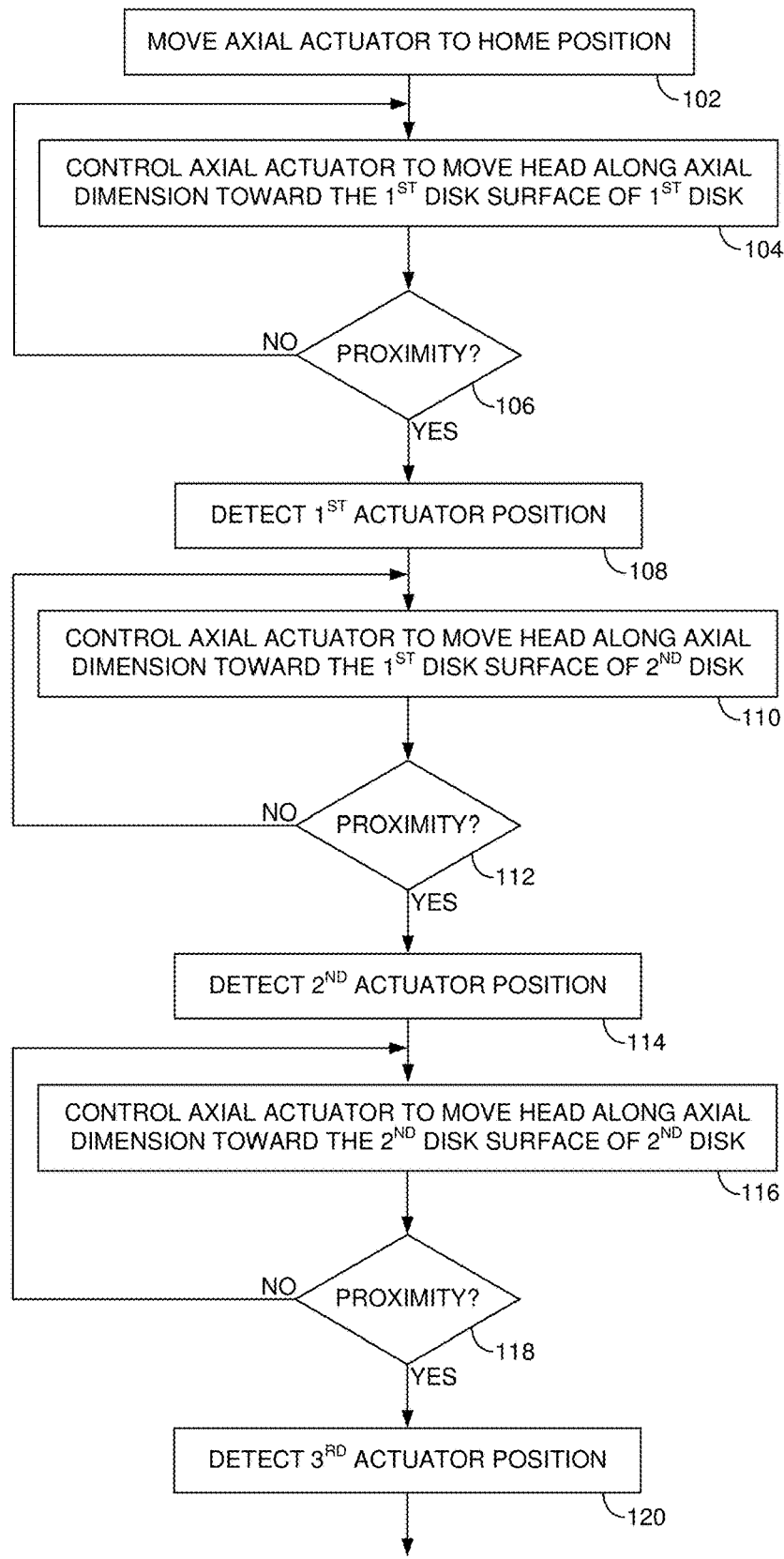

An example of this embodiment is understood with reference to the flow diagram of FIGS. 10A and 10B, wherein an elevator actuator is moved to a home position (block 102), such as the home position shown in FIG. 8A. At block 104 the elevator actuator is controlled to move the head along the axial dimension toward a first disk surface of a first disk (e.g., disk surface 16D in FIG. 2B). When a proximity sensor is triggered (block 106), a first position of the elevator actuator is detected (block 108). At block 110 the elevator actuator is controlled to move the head along the axial dimension toward a first disk surface of a second disk (e.g., disk surface 16B in FIG. 2B). When the proximity sensor is triggered (block 112), a second position of the elevator actuator is detected (block 114). At block 116 the elevator actuator is controlled to move the head along the axial dimension toward a second disk surface of the second disk (e.g., disk surface 16A in FIG. 2B). When the proximity sensor is triggered (block 118), a third position of the elevator actuator is detected (block 120). At block 122 the elevator actuator is controlled to move the head along the axial dimension toward a second disk surface of the first disk (e.g., disk surface 16C in FIG. 2B). When the proximity sensor is triggered (block 124), a fourth position of the elevator actuator is detected (block 126). The first and fourth detected positions are averaged to generate a fifth actuator position representing a load position for the first disk (block 128), and the second and third detected positions are averaged to generate a sixth actuator position representing a load position for the second disk (block 130). At block 132 the elevator actuator is moved to the fifth actuator position (the load position for the first disk), and the radial actuator is controlled to load the heads over the respective disk surfaces of the first disk (block 134).

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, an optical disk drive, a hybrid disk drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable.

Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a first disk comprising a first disk surface;
   a second disk comprising a second disk surface;
   a head;
   an elevator actuator configured to actuate the head along an axial dimension relative to the first and second disks;
   a radial actuator configured to actuate the head radially over the first disk surface or the second disk surface;
   a position sensor configured to generate a sinusoidal sensor signal representing a position of the head along the axial dimension, wherein the position sensor comprises a sensor element and an encoder strip comprising a pattern having at least one region that causes a disturbance in the sinusoidal sensor signal; and
   control circuitry configured to:
      control the elevator actuator to move the head in a first direction along the axial dimension to detect the disturbance in the sinusoidal sensor signal; and
      when the disturbance in the sinusoidal signal is detected, control the elevator actuator to move the head in a second direction along the axial dimension opposite the first direction and measure a zero crossing of the sinusoidal sensor signal.

2. The data storage device as recited in claim 1, wherein the zero crossing represents a home position of the head along the axial dimension.

3. The data storage device as recited in claim 1, wherein:
   the pattern comprises a plurality of alternating polarity fixed magnets; and
   the region in the pattern consists of a segment of one of the fixed magnets.

4. The data storage device as recited in claim 3, wherein the segment is twenty-five to seventy-five percent of one of the fixed magnets.

5. The data storage device as recited in claim 1, wherein:
   the pattern comprises a plurality of alternating polarity fixed magnets; and
   the region in the pattern consists of a first segment of one of the fixed magnets having a first polarity, and a second segment of one of the fixed magnets having a second polarity opposite the first polarity.

6. The data storage device as recited in claim 5, wherein the first segment is ten to thirty percent of one of the fixed magnets and the second segment is ten to thirty percent of one of the fixed magnets.

7. The data storage device as recited in claim 1, wherein the pattern comprises a plurality of segments having an alternating degree of reflectivity.

8. The data storage device as recited in claim 1, wherein the control circuitry is further configured to detect the disturbance in the sinusoidal signal by detecting a decrease in amplitude of the sinusoidal signal.

9. A data storage device comprising:
   a first disk comprising a first disk surface;
   a second disk comprising a second disk surface;
   a head;
   a position sensor configured to generate a sinusoidal sensor signal representing a position of the head along an axial dimension relative to the first and second disks, wherein the position sensor comprises a sensor element and an encoder strip comprising a pattern having at least one region that causes a disturbance in the sinusoidal sensor signal;

a means for moving the head in a first direction along the axial dimension to detect the disturbance in the sinusoidal sensor signal; and when the disturbance in the sinusoidal signal is detected, a means for moving the head in a second direction along the axial dimension opposite the first direction and measuring a zero crossing of the sinusoidal sensor signal.

10. The data storage device as recited in claim 9, wherein the zero crossing represents a home position of the head along the axial dimension.

11. The data storage device as recited in claim 9, wherein:

the pattern comprises a plurality of alternating polarity fixed magnets; and the region in the pattern consist of a segment of one of the fixed magnets.

12. The data storage device as recited in claim 11, wherein the segment is twenty-five to seventy-five percent of one of the fixed magnets.

13. The data storage device as recited in claim 9, wherein:

the pattern comprises a plurality of alternating polarity fixed magnets; and the region in the pattern consists of a first segment of one of the fixed magnets having a first polarity, and a second segment of one of the fixed magnets having a second polarity opposite the first polarity.

14. The data storage device as recited in claim 13, wherein the first segment is ten to thirty percent of one of the fixed magnets and the second segment is ten to thirty percent of one of the fixed magnets.

15. The data storage device as recited in claim 9, wherein the pattern comprises a plurality of segments having an alternating degree of reflectivity.

* * * * *